United States Patent [19]
Johnson

[11] Patent Number: 6,030,106
[45] Date of Patent: Feb. 29, 2000

[54] LIGHT DISPLAY FOR A VEHICULAR WHEEL

[76] Inventor: Johnnie Lee Johnson, 2616 Avenida Del Vista, #204, Corona, Calif. 91720

[21] Appl. No.: 09/083,663

[22] Filed: May 22, 1998

[51] Int. Cl.[7] .................................................. F21Q 1/00
[52] U.S. Cl. ......................... 362/500; 362/543; 362/464; 362/802
[58] Field of Search ..................... 362/500, 543, 362/549, 464, 276, 802

[56] References Cited

U.S. PATENT DOCUMENTS

| | | | |
|---|---|---|---|
| 5,195,813 | 3/1993 | Brown | 362/464 |
| 5,294,188 | 3/1994 | Vancil, Jr. . | |
| 5,392,200 | 2/1995 | Milde . | |
| 5,497,302 | 3/1996 | O'Donnell | 362/802 X |
| 5,552,972 | 9/1996 | Rezvani . | |
| 5,683,164 | 11/1997 | Chien | 362/802 X |
| 5,800,039 | 9/1998 | Lee | 362/500 X |
| 5,876,108 | 3/1999 | Chien | 362/500 X |

Primary Examiner—Laura K. Tso
Attorney, Agent, or Firm—Gene Scott-Patent Law & Venture Group

[57] ABSTRACT

A lighting assembly is mounted to a vehicular wheel in such a manner that a plurality of lamps are positioned on the side of the wheel attached to the wheel rim. Wires connect the lamps to a power source mounted onto the wheel rim inside of the tire. A hand-held, or panel mounted remote control device is used to communicate with the power source, which also has a receiver and control circuit. Through this control means, the lights may be made to blink in unison, sequentially or in any manner desired and to change the light output magnitude. An important aspect of the invention is that the apparatus may be fitted to existing vehicles such as cars, trucks and motorcycles.

8 Claims, 2 Drawing Sheets

LIGHT DISPLAY FOR A VEHICULAR WHEEL

BACKGROUND OF THE INVENTION

1. Field of the Invention

This invention relates generally to vehicle lights and lighting for novelty and safety, and more particularly to a lighting display for use on the wheels of a vehicle, and especially such a display that may be fitted to any existing vehicle.

2. Description of Related Art

The following art defines the present state of this field:

Milde, U.S. Pat. No. 5,392,200 describes a circuit for providing illumination on a wheel hub cap comprises a plurality of electric lights, adapted to be arranged on the hub cap; an electric battery, adapted to be arranged on the hub cap; and at least one inertial switch connected electrically in series between the battery and the electric lights and adapted to be arranged on the hub cap in spaced relationship to the central axis of the hub cap and with such orientation as to be closed by centrifugal force upon rotation of the hub cap.

Vancil, Jr., U.S. Pat. No. 5,294,188 describes a roller skate wheel having a conical cavity includes an insert housing arranged for complementary reception within the cavity. The housing includes a housing base plate, with the base plate including a socket to receive the wheel fastening axle structure there within. A transparent forward plate is mounted in a spaced, parallel relationship relative to the base plate. A plurality of illumination bulbs diametrically aligned within the housing adjacent the forward plate are in electrical communication with a battery housing mounted medially of the housing, and wherein the battery and battery housing include first electrical contact support legs resiliently mounted, with the first electrical contacts mounted to distal ends of the legs for engagement with further electrical contact legs directed into the illumination bulbs, whereupon centrifugal force in use of the roller skate wheel completes electrical circuitry to effect illumination of the bulbs within the housing.

Rezvani, U.S. Pat. No. 5,552,972 describes a lighted wheel which is preferably self-powered is provided which includes a rotatable wheel, an electrical power source connected to the wheel and a light-emitting member electrically coupled to the power source and carried by the wheel. The power source is preferably a dynamo carried by the wheel. The wheel preferably includes a traction tire and is a support wheel for use with a frame configured for light bulb or a light-emitting diode mounted on the tire for displaying light when the wheel is rotated on the frame, such as a skate frame.

The prior art teaches lighting equipment for skate wheels and automotive vehicle wheels as well. However, the prior art does not teach that a remotely controlled light apparatus may be incorporated into a wheel assembly by fitting to an existing wheel. The present invention fulfills these needs and provides further related advantages as described in the following summary.

SUMMARY OF THE INVENTION

The present invention teaches certain benefits in construction and use which give rise to the objectives described below.

A lighting assembly is mounted to a vehicular wheel in such a manner that a plurality of lamps are positioned on the side of the wheel attached to the wheel rim. Wires connect the lamps to a power source mounted onto the wheel rim inside of the tire. A hand-held, or panel mounted remote control device is used to communicate with the power source, which also has a receiver and control circuit. Through this control means, the lights may be made to link in unison, sequentially or in any manner desired and to change the light output magnitude. An important aspect of the invention is that the apparatus may be fitted to existing vehicles such as cars, trucks and motorcycles.

A primary objective of the present invention is to provide a lighting apparatus for the wheels of a vehicle, having advantages not taught by the prior art.

Another objective is to provide such a lighting apparatus that is particularly designed to mount onto an existing wheel without alteration of the wheel.

A further objective is to provide such a lighting apparatus that may be remotely controlled from the cab of the vehicle or from a distance.

A still further objective is to provide such a lighting apparatus that may be programmed to produce an interesting and eye catching light effect.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figures 1, 3:
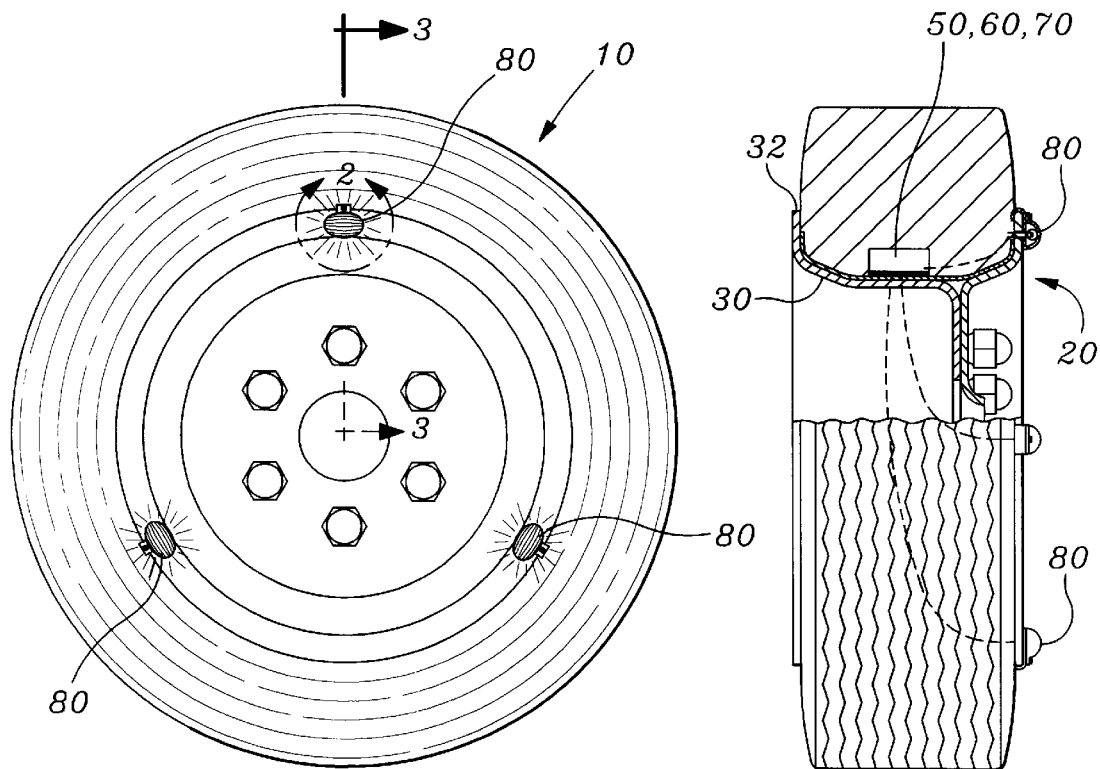
FIG. 1 is a side elevational view of the present invention.
FIG. 3 is a partial sectional view thereof taken along line 3—3 in FIG. 1.
Figure 5:
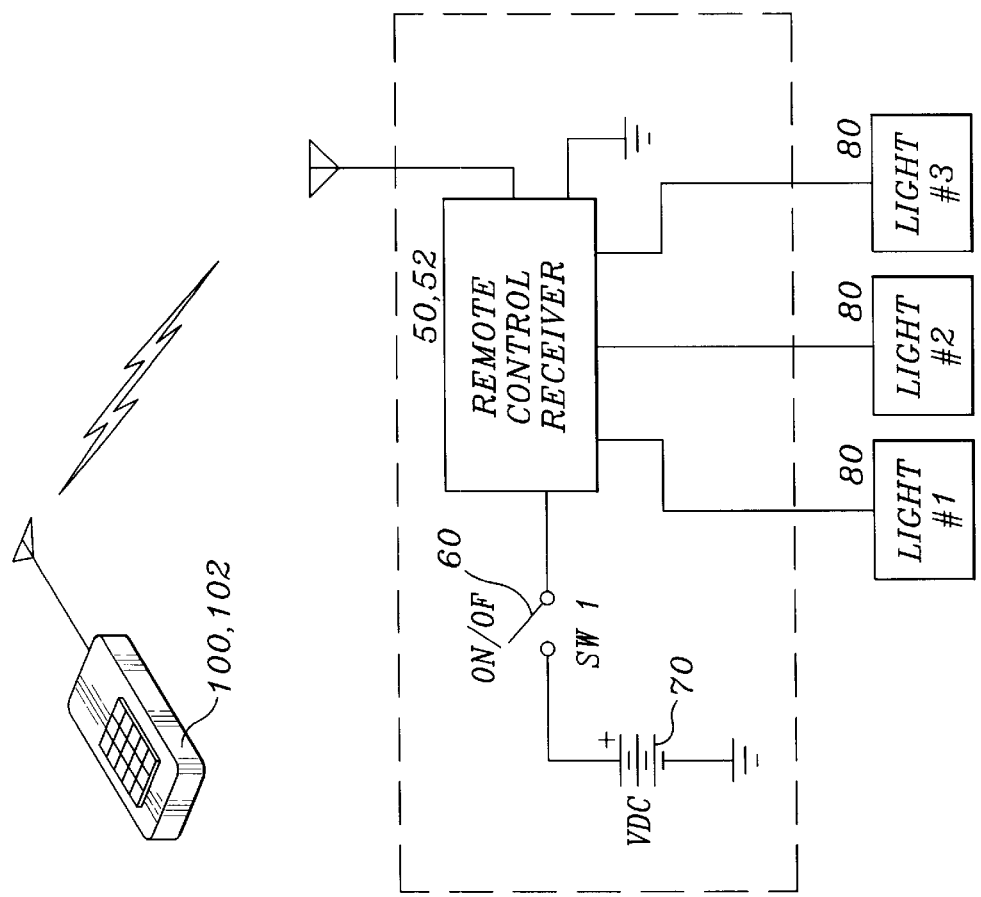
FIG. 5 is an elementary electrical schematic diagram of the invention.

The above described drawing figures illustrate the invention, a combination vehicular wheel assembly 10 and lighting apparatus 20 as shown in the figures, the vehicular wheel assembly 10 comprising a wheel rim 30 and a tire 40 mounted onto the wheel rim 30, the wheel rim 30 providing an annular wheel rim edge 32 as shown in FIG. 3; the lighting apparatus 20 comprising: a wireless signal receiver 50 preferably of the radio wave type, i.e., AM, FM or PM; an electrical switch 60; a portable power source 70 such as a battery; a plurality of lamps 80 such as incandescent lamps or LED's, each of the lamps 80 providing a mechanical clip 82 for mounting the lamp 80 onto the annular wheel rim edge 32; and an electrical interconnection means 90 such as common insulated electrical wires, joining the wireless signal receiver 50 and the plurality of lamps 80 for electrical current flow between them, to illuminate the lamps. The combination further includes a remote control means 100 including a portable wireless signal transmitter 102 as shown in FIG. 5. The signal receiver 50, portable power source 70 and electrical switch 60, all are preferably fixedly positioned as a single module box on the wheel rim 30, affixed by either mechanical means or a bonding agent, and enclosed by the tire 40 as shown in FIG. 3, the plurality of lamps 80 are designed to be fixed to the annular wheel rim edge 32 by the clips 82, such that the lamps 80 are visible from one side of the vehicular wheel (assembly) 10, the remote control means 100 is functionally enabled for signaling the signal receiver 50 for enabling the application of a current flow to illuminate the plurality of lamps 80.

Preferably, the lamp mounting clips 82 are each C-shaped, each of the lamps 80 further providing a tightening screw 84 for fastening the clips 82 to the wheel rim edge 32. Alternately, the C-shaped clips may be merely swaged into place as is known for placing balancing weights on an automotive wheel rim.

Figures 2, 4:
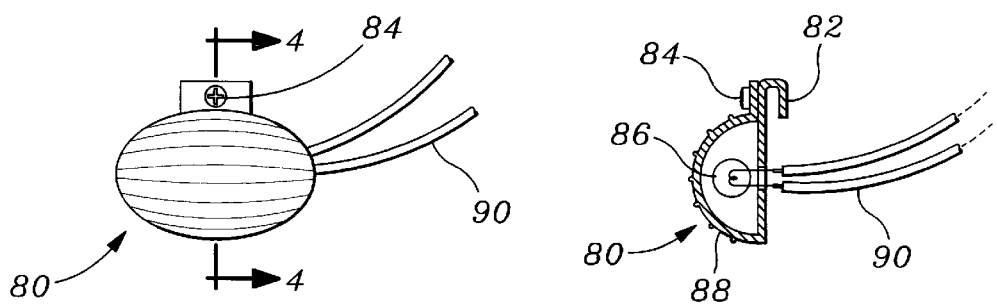
FIG. 2 is an enlarged view of a portion of FIG. 1 shown by line 2.
FIG. 4 is a sectional view taken along line 4—4 in FIG. 2.

Preferably, each of the lamps 80 provides an electric bulb 86 and a translucent housing 88 formed around the electric bulb 86 as shown in FIGS. 2 and 4. Such a housing 88 may be made of glass, or preferably, a molded plastic as is well known in the automotive industry.

Preferably, the electrical switch 60 is constructed and positioned so as to be actuated by rotation of the vehicular wheel 10. Such switches are very well known in the art as for instance mercury fluid switches or weighted spring contact switches both of which react to the centripetal forces present for closing an electrical contact in a circuit as shown in FIG. 5.

Preferably, the signal receiver 50 further provides a current flow control means 52 enabled for controlling current flow magnitude, and/or controlling current flow as a function of time, such as time sequence illumination of the plurality of lamps 80. The current flow control means 52 is not shown as a circuit here in that it may take any one or more of many forms as shown in the electrical circuits of the art. For instance a sequence timing circuit that is applicable in the present application is described in Texas Instruments Linear Control Circuits Data Book, second edition, page 289, and a sequential timer circuit that is further applicable in the present application is described in Signetics Analog Data Manual, 1983, page 15-11, both of which are incorporated herein by reference. Such circuits are capable of illuminating the lamps 80 in sequence, of causing the lamps 80 to blink at any desired rate, or to change blink rate in accordance with a program. The signal receiver 50 is preferably a solid state circuit capable of withstanding the centripetal forces involved with a high speed spinning wheel and the jarring forces when the wheel is moving over rough terrain.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination vehicular wheel assembly and lighting device, the combination comprising:

a vehicular wheel assembly comprising a wheel rim and a tire mounted onto the wheel rim, the wheel rim providing an annular wheel rim edge;

a lighting device comprising:
   a) a wireless signal receiver;
   b) an electrical switch;
   c) a portable power source;
   d) a plurality of lamps, each of the lamps providing a clip for mounting the lamp onto the annular wheel rim edge; and
   e) electrical interconnection means joining the wireless signal receiver and the plurality of lamps for electrical current flow;

a remote control means including a portable wireless signal transmitter;

the signal receiver, portable power source and electrical switch, all being fixedly positioned on the wheel rim and enclosed by the tire, the plurality of lamps fixed to the annular wheel rim edge by the clips, such that the lamps are visible from one side of the vehicular wheel, the remote control means functionally enabled for signaling the signal receiver for enabling the application of a current flow to illuminate the plurality of lamps.

2. The combination of claim 1 wherein the lamp mounting clips are each C-shaped, each of the lamps further providing a tightening screw for fastening the clips to the wheel rim.

3. The combination of claim 2 wherein each of the lamps provides an electric bulb and a translucent housing formed around the electric bulb.

4. The combination of claim 1 wherein the electrical switch is constructed and positioned so as to be actuated by rotation of the vehicular wheel.

5. The combination of claim 1 wherein the signal receiver further provides a current flow control means.

6. The combination of claim 5 wherein the current flow control means is enabled for controlling current flow magnitude.

7. The combination of claim 5 wherein the current flow control means is enabled for controlling current flow as a function of time.

8. The combination of claim 7 wherein the function of time results in time sequence illumination of the plurality of lamps.

\* \* \* \* \*